United States Patent
Lentz

(10) Patent No.: US 11,072,217 B2
(45) Date of Patent: Jul. 27, 2021

(54) METHOD FOR CONTROLLING THE TRACTION OF A PNEUMATICALLY SPRUNG VEHICLE AND AIR SUSPENSION SYSTEM FOR CARRYING OUT THE METHOD

(71) Applicant: WABCO GmbH, Hannover (DE)

(72) Inventor: Uwe Lentz, Neustadt (DE)

(73) Assignee: WABCO GmbH, Hannover (DE)

(*) Notice: Subject to any disclaimer, the term of this patent is extended or adjusted under 35 U.S.C. 154(b) by 486 days.

(21) Appl. No.: 15/312,834

(22) PCT Filed: May 22, 2014

(86) PCT No.: PCT/EP2014/001378
§ 371 (c)(1),
(2) Date: Nov. 21, 2016

(87) PCT Pub. No.: WO2015/176732
PCT Pub. Date: Nov. 26, 2015

(65) Prior Publication Data
US 2017/0113507 A1    Apr. 27, 2017

(51) Int. Cl.
*B60G 17/016* (2006.01)
*B60G 17/015* (2006.01)
(Continued)

(52) U.S. Cl.
CPC ....... *B60G 17/0164* (2013.01); *B60G 17/018* (2013.01); *B60G 17/0155* (2013.01);
(Continued)

(58) Field of Classification Search
None
See application file for complete search history.

(56) References Cited

U.S. PATENT DOCUMENTS 4,819,995 A * 4/1989 Lohmann ............... B60T 8/343
                                                       180/197
5,350,225 A * 9/1994 Steiner .................. B60T 7/042
                                                       303/113.4

(Continued)

FOREIGN PATENT DOCUMENTS

DE        19929221 A1    12/2000
DE        10354289 A1     6/2005
(Continued)

OTHER PUBLICATIONS

English Translation of JPH09109645 translated 2018 (Year: 1997).*
(Continued)

*Primary Examiner* — Nicholas K Wiltey
(74) *Attorney, Agent, or Firm* — Dickinson Wright PLLC

(57) ABSTRACT

In a pneumatically sprung vehicle (1) with a front steering axle (A), one rear drive axle (TA) and one trailing axle (SA), traction is controlled by an air suspension system (36), having a "pressure ratio control" mode maintaining a parametrised ratio of air pressures in supporting bellows (2, 4) of the drive axle (TA) compared to air pressures in supporting bellows (3, 5) of the trailing axle (SA); a "relieve loading of trailing axle" mode checking whether relieving of the loading of the trailing axle (SA) is possible without overloading the drive axle (TA); and an "optimum traction" control mode increasing the pressure in the supporting bellows (2, 4) of the drive axle (TA) and reducing the pressure in the supporting bellows (3, 5) of the trailing axle (SA) without exceeding the maximum permissible axle load of the drive axle (TA) while maintaining residual pressure of the trailing axle (SA).

7 Claims, 2 Drawing Sheets

(51) Int. Cl.
B60G 17/052 (2006.01)
B60G 17/018 (2006.01)

(52) U.S. Cl.
CPC .. B60G 17/0528 (2013.01); *B60G 2300/0262* (2013.01); *B60G 2400/51222* (2013.01); *B60G 2400/61* (2013.01); *B60G 2800/182* (2013.01); *B60G 2800/214* (2013.01)

(56) References Cited

U.S. PATENT DOCUMENTS

| | | | | |
|---|---|---|---|---|
| 6,276,710 | B1* | 8/2001 | Sutton | B60G 5/04 280/124.128 |
| 2002/0074746 | A1 | 6/2002 | Eberling et al. | |
| 2003/0127819 | A1* | 7/2003 | Richardson | B60G 5/00 280/124.157 |
| 2005/0017474 | A1* | 1/2005 | Heer | B60T 17/02 280/124.16 |
| 2006/0043691 | A1* | 3/2006 | Geiger | B60G 17/0155 280/124.16 |
| 2007/0170679 | A1* | 7/2007 | Stender | B60G 17/0523 280/124.16 |
| 2008/0269986 | A1 | 10/2008 | Regnell et al. | |
| 2012/0043806 | A1* | 2/2012 | Unkenbach | B60T 8/348 303/113.1 |
| 2012/0217794 | A1* | 8/2012 | Wieder | B60T 15/027 303/113.2 |
| 2012/0319463 | A1* | 12/2012 | Lloyd | B60T 1/10 303/3 |
| 2012/0319464 | A1* | 12/2012 | Lloyd | B60T 1/10 303/3 |
| 2013/0140784 | A1* | 6/2013 | Ehrlich | B60G 17/0528 280/124.159 |
| 2013/0228991 | A1* | 9/2013 | Gerami-Manesch | B60G 17/0155 280/124.16 |
| 2013/0257007 | A1* | 10/2013 | Frank | B60G 17/0523 280/124.161 |
| 2014/0196797 | A1* | 7/2014 | Dietel | F16K 27/02 137/15.18 |
| 2015/0345490 | A1* | 12/2015 | Bremeier | F04B 49/06 417/22 |

FOREIGN PATENT DOCUMENTS

| | | |
|---|---|---|
| DE | 102004010548 A1 | 9/2005 |
| DE | 102004010561 A1 | 9/2005 |
| DE | 102006011183 A1 | 9/2007 |
| DE | 60314533 T2 | 2/2008 |
| DE | 102010053264 A1 | 6/2012 |
| EP | 0372218 A2 | 6/1990 |
| EP | 0411352 A1 | 2/1991 |
| EP | 0416310 A1 | 3/1991 |
| JP | H05169956 A | 7/1993 |
| JP | H08300929 A | 11/1996 |
| JP | H09109645 A | 4/1997 |
| WO | 00/00360 A1 | 1/2000 |

OTHER PUBLICATIONS

DE102010053264.9 certified copy attached (Year: 2010).*
European Patent Office, Rijswijk, Netherlands, International Search Report of International Application No. PCT/EP2014/001378, dated Jul. 14, 2014, 4 pages.

* cited by examiner

METHOD FOR CONTROLLING THE TRACTION OF A PNEUMATICALLY SPRUNG VEHICLE AND AIR SUSPENSION SYSTEM FOR CARRYING OUT THE METHOD

TECHNICAL FIELD

The invention relates to a method and to an air suspension system for traction regulation in a vehicle with pneumatic suspension, which vehicle has at least one front steering axle, at least one rear drive axle and a trailing axle in front of or behind the drive axle.

BACKGROUND

EP 0 411 352 B1 has described an axle load control device which serves as a starting aid for multi-axle vehicles with air suspension in which air spring bellows which can be supplied with compressed air via valve means are provided at the axles. Aside from at least one drive axle, at least one liftable auxiliary axle is provided which is referred to as lifting axle, or at least one auxiliary axle which can be relieved of load is provided in the form of a trailing axle, which is arranged in front of or behind the drive axle. For activation of the starting aid, the pneumatic spring bellows of the auxiliary axle are deaerated, and, if required, the lifting axle is additionally raised by way of a lifting device, whereby the axle load thereby released is transferred to the drive axle in order to thereby increase the axle load on the drive axle. When the maximum axle load on the drive axle is reached, the electrical circuit to the solenoid valves which effect the axle load shift is interrupted by way of a pressure switch which is connected to an air spring bellows of the drive axle. A further increase of the axle load on the drive axle is thereby prevented, the axle load shift that has been realized is held constant, and thus the legally permitted load on the drive axle is fully utilized. The pressure in all of the pneumatic spring bellows of the drive axle is used as a measure for the axle load.

DE 10 2004 010 548 A1 discloses a vehicle starting aid, for increasing traction in the presence of low friction coefficient, on a vehicle with an auxiliary axle that can be relieved of load, in the case of which vehicle starting aid the axle load shift is performed on the basis of present axle load weight forces at said axles. In this way, the dependency of the starting aid traction increase on the ride height of the vehicle is eliminated, and a stroke/supporting force characteristic, which normally changes with the ride height, of pneumatic spring bellows is taken into consideration in the axle load shift. In this way, it is sought to achieve that the starting aid satisfies the legally admissible specifications at all ride heights.

If a distribution of axle load between the drive axle and the trailing axle is performed throughout driving operation, in such a way that the drive axle is always actually loaded to 100% of its legally prescribed maximum load capacity, a regulation mode is implemented which is known under the expression "optimum traction". Said regulation mode can be manually input by the driver as a control command into an axle load control device.

In vehicles equipped with a regulation device as per EP 0 411 352 B1 and/or with a regulation device for implementing the regulation mode "optimum traction", it is possible for all of the axles, or else only the drive axle and the auxiliary axle, which can be relieved of load and which is in the form of a trailing axle, to additionally be equipped with an electronic ride-height regulation unit. In this case, the air volume in the air spring bellows of said axles is regulated by way of the electronic ride-height regulation unit, and by way of valve means controlled by said unit, such that a predefined setpoint ride height between the body and the axles is realized. If the auxiliary axle, which can be relieved of load, of the vehicle is activated, for example in the presence of intense loading, for the purposes of supporting force assistance, then the air spring bellows of said auxiliary axle are, with the drive axle air spring bellows, likewise aerated or deaerated by way of the ride-height regulation control unit for the purposes of height equalization, wherein the pressures in the air spring bellows of the auxiliary axle, which can be relieved of load, and in the air spring bellows of the drive axle can be regulated for example to a certain pressure ratio, which is referred to as "parameterized pressure ratio", for which purpose at least in each case one pressure sensor is required at the air spring bellows of the auxiliary axle which can be relieved of load and at the air spring bellows of the drive axle. For this purpose, the vehicle driver inputs a control command with the designation "pressure ratio regulation" into a corresponding axle load control device.

Independently of the described starting aids as per EP 0 411 352 B1 and DE 10 2004 010 548 A1, the invention relates to the field of pressure regulation in the air spring bellows of a trailing axle for the normal driving operation of a vehicle, specifically such that the legally maximum load on the rear drive axle of the vehicle is utilized to the greatest possible extent, but is not exceeded, both in the presence of maximum load and during empty running. The previously known control and regulation methods are regarded as not being optimal for this purpose.

SUMMARY

Against this background, it is the object of the invention to propose, for a vehicle with a rear drive axle and a trailing axle, a novel regulation method and a related air spring system by way of which the load distribution between the rear drive axle and the trailing axle can be set more effectively than previously, in particular for empty running.

Said object is achieved, according to a first variant of the invention, by way of a method for traction regulation in a vehicle with pneumatic suspension, which vehicle has at least one front steering axle, at least one rear drive axle and a trailing axle in front of or behind the drive axle, by way of an electronic or regulated air suspension system, having at least the steps:

proceeding from a regulation mode "pressure ratio regulation", in which a parameterized ratio of the air pressures in the supporting bellows of the at least one drive axle in relation to the air pressures in the supporting bellows of the trailing axle is maintained, switching to a regulation mode "relieve trailing axle of load", checking whether relieving the trailing axle of load is possible without thereby overloading the drive axle, if relieving the trailing axle of load in this way is possible, automatically switching to a regulation mode "optimum traction", in which the pressure in the supporting bellows of the at least one drive axle is increased and the pressure in the supporting bellows of the trailing axle is decreased in order to thereby effect a load shift to the at least one drive axle by relieving the trailing axle of load, without exceeding the maximum admissible axle load of the at least one drive axle, and relieving the trailing axle of load to a point of residual pressure maintenance, and thereby shifting load to the drive axle up to the maximum admissible axle load thereof, switching back to the regulation mode "pressure ratio regulation", with simultaneous increase of load on the trailing axle and relief of the drive axle of load, if the vehicle driver outputs a signal for increasing load on the trailing axle again.

The regulation mode "relieve trailing axle of load" is to be understood to mean a setting which can be selected by the vehicle driver and which the vehicle driver can activate if the vehicle is only incompletely loaded or is not loaded at all. The expression "residual pressure maintenance" is to be understood to mean that the supporting bellows of the trailing axle are not fully deaerated, with a predetermined minimum air pressure instead remaining therein.

Thus, during empty running, the vehicle driver merely needs to actuate a button or switch in order to initiate the regulation mode "relieve trailing axle of load", whereby the electronic regulated air suspension system automatically effects, according to the invention, the relief of the trailing axle of load down to a residual pressure, and thus the load shift to the drive axle, without the need for further intervention on the part of the vehicle driver.

The method according to the invention may also be performed without active intervention by the vehicle driver, that is to say without the actuation of a button or switch for the regulation mode "relieve trailing axle of load". Accordingly, the stated object is, according to a second invention variant, achieved by way of a method for traction regulation in a vehicle with pneumatic suspension, which vehicle has at least one front steering axle, at least one rear drive axle and a trailing axle in front of or behind the drive axle, by way of an electronic or regulated air suspension system, having at least the steps:

proceeding from a regulation mode "pressure ratio regulation", in which a parameterized ratio of the air pressures in the supporting bellows of the at least one drive axle in relation to the air pressures in the supporting bellows of the trailing axle is maintained, continuously checking whether relieving the trailing axle of load is possible without thereby overloading the drive axle, if relieving the trailing axle of load in this way is possible, automatically switching to a regulation mode "optimum traction", in which the pressure in the supporting bellows of the at least one drive axle is increased and the pressure in the supporting bellows of the trailing axle is decreased in order to thereby effect a load shift to the at least one drive axle by relieving the trailing axle of load, without exceeding the maximum admissible axle load of the at least one drive axle, relieving the trailing axle of load to a point of residual pressure maintenance, and thereby shifting load to the drive axle up to the maximum admissible axle load thereof, continuously checking the axle load of the drive axle, and switching back to the regulation mode "pressure ratio regulation", with simultaneous increase of load on the trailing axle and relief of the drive axle of load, if, during the check, an exceedance of the maximum admissible axle load at the drive axle is detected.

With regard to a device, the stated object is achieved by way of an air suspension system for a vehicle, having at least one front steering axle, at least one rear drive axle and a trailing axle in front of or behind the drive axle, comprising an electronic control and regulation unit, an operating unit which can be actuated by a vehicle driver and which is connected to the electronic control and regulation unit, a valve block which is connected to the electronic control and regulation unit and which has multiple switching valves, and in each case one pressure sensor, connected to the electronic control and regulation unit, at each of the supporting bellows of the at least one drive axle and of the trailing axle, wherein the electronic control and regulation unit is designed to do the following:

in the regulation mode "pressure ratio regulation", checking, on the basis of the present supporting bellows pressures, whether relieving the trailing axle of load is possible without thereby overloading the at least one drive axle, if this is the case, automatically switching into a regulation mode "optimum traction", and in the regulation mode "optimum traction", increasing the pressure in the supporting bellows of the at least one drive axle by actuating the switching valves of the valve block, and decreasing the pressure in the supporting bellows of the trailing axle to a parameterized residual pressure, in order to thereby effect a load shift to the at least one drive axle by relieving the trailing axle of load without exceeding the maximum admissible axle load of the at least one drive axle and without undershooting the minimum admissible axle load of the trailing axle.

Said regulation modes can be implemented with a valve block which has an electromagnetic 3/2-way valve whose inlet is connected to a compressed-air source, whose first outlet is connected to a deaeration device, and who second outlet is connected to the inlets of four electromagnetic 2/2-way valves, of which the outlets of a first and of a second electromagnetic 2/2-way valve are connected to a first supporting bellows and to a second supporting bellows respectively of the at least one drive axle, and the outlets of a third and of a fourth electromagnetic 2/2-way valve are connected to a third supporting bellows and to a fourth supporting bellows respectively of the trailing axle.

In this embodiment, the electronic control and regulation unit is designed to, in the regulation mode "optimum traction", effect the release of the trailing axle of load and the increase of load on the at least one drive axle by virtue, firstly, of the electromagnetic 3/2-way valve being switched into a pass-through position for compressed air from the first to fourth electromagnetic 2/2-way valves to the deaeration device and, at the same time, the third and fourth electromagnetic 2/2-way valves of the trailing axle being switched into a pass-through position, whereas the first and second electromagnetic 2/2-way valves of the at least one drive axle are held in their blocking position in order to deaerate the supporting bellows of the trailing axle to a residual pressure, and then the third and fourth electromagnetic 2/2-way valves of the trailing axle are switched into their blocking position again, and subsequently, the electromagnetic 3/2-way valve is switched again into a pass-through position for compressed air from the compressed-air source to the first to fourth electromagnetic 2/2-way valves, and the first and second electromagnetic 2/2-way valves of the at least one drive axle are switched into a pass-through position in order to regulate the air pressure in the first two supporting bellows of the at least one drive axle to such an extent that the maximum admissible axle load of the at least one drive axle is not exceeded and the minimum admissible axle load of the trailing axle is not undershot and the ride height is attained.

In the embodiments of the air suspension system according to the invention defined above, the electronic control and regulation unit may be designed to monitor the at least one drive axle with regard to an exceedance of the admissible axle load on the basis of the present supporting bellows pressures, and furthermore automatically switch from the regulation mode "optimum traction" back to the regulation mode "pressure ratio regulation" if the admissible axle load of the at least one drive axle is exceeded, and to furthermore control the increase of load on the trailing axle and the load shift to the trailing axle and the adherence to the admissible axle load of the at least one drive axle.

In another embodiment, the operating unit may be designed to transmit a control command "relieve trailing axle of load", input by the vehicle driver at the start of or during empty running, to the electronic control and regulation unit, whereby the electronic control and regulation unit is caused to correspondingly actuate the switching valves of the valve block in order to relieve the trailing axle of load.

Fully automatic operation of the air suspension system can be achieved if said electronic control and regulation unit is designed to detect, on the basis of the supporting bellows pressures, whether empty running is present, and to correspondingly automatically actuate the switching valves of the valve block in order to relieve the trailing axle of load.

The invention will be discussed in more detail below on the basis of exemplary embodiments illustrated in the attached drawings. The drawings are provided herewith purely for illustrative purposes and are not intended to limit the scope of the present invention.

DETAILED DESCRIPTION OF THE DRAWINGS

Figure 1:
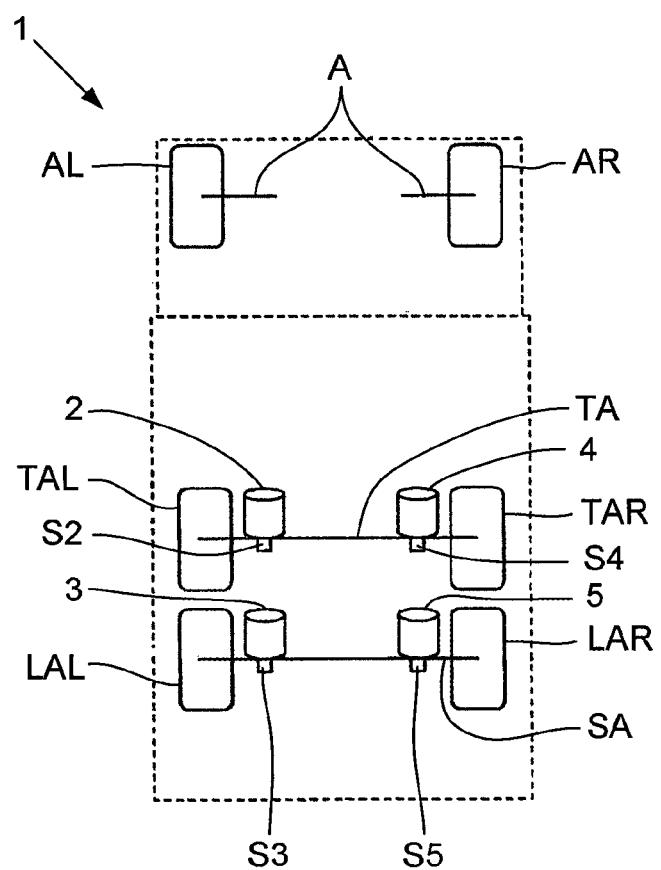
FIG. 1 shows a schematic plan view of a vehicle having a front steering axle, a rear drive axle and a trailing axle.

FIG. 1 shows, in a plan view, a diagrammatic illustration of a vehicle 1 with a front steering axle A and with a rear drive axle TA and with a non-driven trailing axle SA. The load of the vehicle 1 is supported inter alia via a first supporting bellows 2 on a left drive wheel TAL and via a second supporting bellows 4 on a right drive wheel TAR of the drive axle TA. A first pressure sensor S2 is arranged on the first supporting bellows 2, and a second pressure sensor S4 is arranged on the second supporting bellows 4, for the purposes of sensing the pressures in the supporting bellows 2, 4 of the drive axle TA.

Similarly, the trailing axle SA is supported by way of a third supporting bellows 3, which is adjacent to the left wheel LAL of the trailing axle SA, and by way of a fourth supporting bellows 5, which is adjacent to the right wheel LAR of the trailing axle SA. The pressures in said two supporting bellows 3 and 5 are sensed by a third pressure sensor S3 at the third supporting bellows 3 and by a fourth pressure sensor S5 at the fourth supporting bellows 5.

Figure 2:
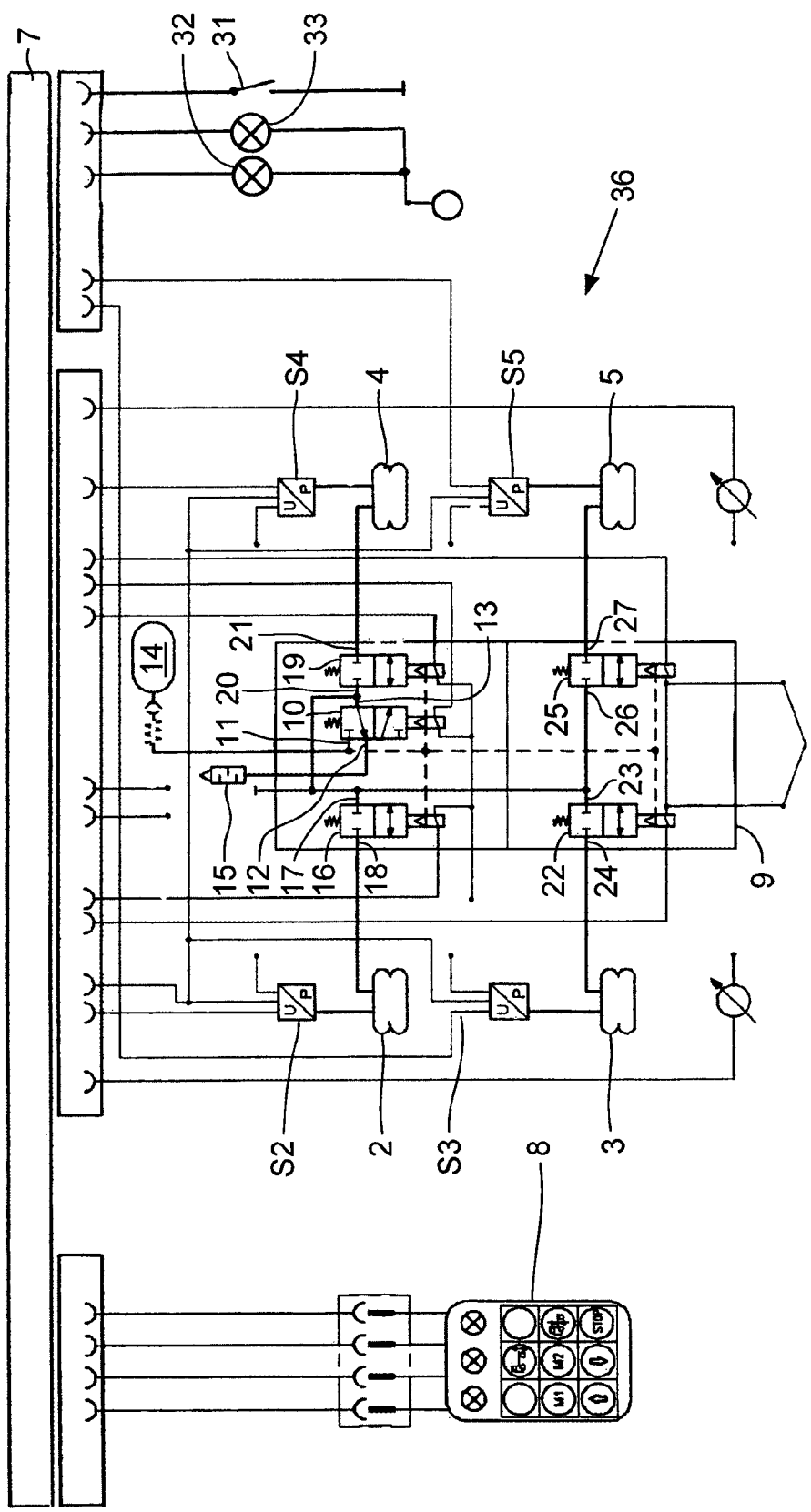
FIG. 2 is a schematic illustration of a circuit diagram of an air suspension system for a vehicle with a trailing axle.

FIG. 2 illustrates an electronically controlled air suspension system 36 for the vehicle shown in FIG. 1, having a drive axle TA and having a trailing axle SA. An electronic control and regulation unit 7 is connected to an operating unit 8 which can be actuated by a vehicle driver, to a valve block 9, to the abovementioned pressure sensors S2, S3, S4, S5 on the four supporting bellows 2, 3, 4, 5, to a switch 31 for switching from a regulation mode "pressure ratio regulation" to a regulation mode "optimum traction", to an indicator lamp 32 "load shift" and to an indicator lamp 33 "safety". The pressure sensors S2, S4, S3, S5 measure the pressures in the supporting bellows 2, 4, 3, 5 and transmit these via sensor lines to the electronic control and regulation unit 7. The operating unit 8 serves for manual adjustment of the vehicle ride height by the driver.

The valve block 9 has an electromagnetic 3/2-way valve 10, the inlet 11 of which is connected to a compressed-air source 14 whose first outlet 12 is connected to a deaeration line 15 and whose second outlet 13 is connected to the inlets 17, 20, 23, 26 of four electromagnetic 2/2-way valves with the reference designations 16, 19, 22, 25. The outlets 18, 21 of the first and of the second electromagnetic 2/2-way valves 16, 19 are connected to the first supporting bellows 2 and to the second supporting bellows 4 respectively of the drive axle TA. The outlets 24, 27 of the third and fourth electromagnetic 2/2-way valves 22, 25 are connected to the first supporting bellows 3 and to the fourth supporting bellows 5 respectively of the trailing axle SA.

A right-hand regulation device such as is known in conjunction with air suspension systems has the effect, by way of the electronic control and regulation unit 7, that the electromagnetic 3/2-way valve 10 passes into the position in which the compressed-air source 14 is connected via the inlet 11 and the second outlet 13 to the inlets 17, 20, 23, 26 of the four electromagnetic 2/2-way valves 16, 19, 22, 25, of which the electromagnetic 2/2-way valves 16, 19, 22, 25 assigned to the supporting bellows are switched, and remain switched, to a pass-through position until enough compressed air has passed into the supporting bellows 2, 4 of the drive axle TA and into the supporting bellows 3, 5 of the trailing axle SA to produce and maintain a predefined setpoint vehicle ride height. This right-hand regulation is not a constituent part of the present invention, and therefore further details will not be described.

The electronic control and regulation unit 7 is designed to, in the regulation mode "pressure ratio regulation", maintain a parameterized pressure ratio between the two supporting bellows 2, 4 of the drive axle TA and the two supporting bellows 3, 5 of the trailing axle SA by actuating the 2/2-way valves 16, 19, 22, 25 of the valve block 9.

In the regulation mode "optimum traction", the electronic control and regulation unit 7 can increase the pressure in the first and second supporting bellows 2, 4 of the drive axle TA by actuating the 2/2-way valves 16, 19, 22, 25 of the valve 9 and decrease the pressure in the third and fourth supporting bellows 3, 5 of the trailing axle SA to a point of residual pressure maintenance, in order thereby to effect a load shift to the drive axle TA by relieving the trailing axle SA of load without exceeding the maximum admissible axle load of the drive axle TA and without undershooting the minimum admissible axle load of the trailing axle SA.

For as long as the regulation mode "pressure ratio regulation" is in effect, the electronic control and regulation unit 7 checks, on the basis of the present supporting bellows pressures, whether relieving the trailing axle SA of load is possible without thereby overloading the drive axle TA, and, if this is the case, automatically switches to the regulation mode "optimum traction".

In the regulation mode "optimum traction", the electronic control and regulation unit 7 effects the relief of the trailing axle SA of load and the increase of load on the drive axle TA by virtue, firstly, of the electromagnetic 3/2-way valve 10 being switched into a pass-through position for compressed air from the first to fourth electromagnetic 2/2-way valves

16, 19, 22, 25 to the deaeration device 15. Here, however, only the two electromagnetic 2/2-way valves of the trailing axle SA, specifically the third and the fourth electric 2/2-way valve 22, 25, are switched into a pass-through position, whereas the first and second electromagnetic 2/2-way valves 16, 19 of the at least one drive axle TA are held in their blocking position. As a result, the supporting bellows 3, 5 of the trailing axle SA are deaerated to a predefined, parameterizable residual pressure. Subsequently, the third and fourth electromagnetic 2/2-way valves 22, 25 of the trailing axle SA are switched into their blocking position again. Subsequently, the electromagnetic 3/2-way valve 10 is switched again into a pass-through position for compressed air from the compressed-air source 14 to the first to fourth electromagnetic 2/2-way valves 16, 19, 22, 25, and the first and second electromagnetic 2/2-way valves 22, 25 assigned to the drive axle TA are switched into a pass-through position. In this way, the air pressure in the first two supporting bellows 2, 4 of the at least one drive axle TA can be regulated to such an extent that the maximum admissible axle load of the at least one drive axle TA is not exceeded and the minimum admissible axle load of the trailing axle SA is not undershot.

The parameterizable residual pressure maintenance in the supporting bellows 3, 5 of the trailing axle SA is necessary in order to adhere to the minimum admissible axle load of the trailing axle SA required to ensure adequate ground adhesion of the trailing axle SA required for safe driving of the vehicle 1.

The electronic control and regulation unit 7 is also capable of continuously monitoring the drive axle TA with regard to the exceedance of the admissible axle load on the basis of the present supporting bellows pressures and performing an automatic switch into the regulation mode "pressure ratio regulation" if the admissible axle load of the drive axle TA is exceeded, and controlling the increase of load on the trailing axle SA and the load shift to the trailing axle SA and the adherence to the admissible axle load of the drive axle TA. It is achieved in this way that the vehicle driver is no longer required to actively switch into the regulation mode "pressure ratio regulation" if the vehicle 1 is loaded after empty running, because the electronic control and regulation unit 7 is, by way of the four pressure sensors S2, S4, S3, S5, provided with information as regards whether the admissible axle load of the drive axle TA is exceeded.

In the proposed embodiment, the switch 31 serves for enabling a vehicle driver to manually switch from a previously set regulation mode "pressure ratio regulation" to the regulation mode "optimum traction" when required, that is to say preferably before commencement of empty running. In this way, the electronic control and regulation unit 7 receives the control command "relieve trailing axle of load", as a result of which the control and regulation unit 7 actuates the four 2/2-way valves 16, 19, 22, 25 of the valve block 9 for the purposes of relieving the trailing axle SA of load and increasing load on the drive axle TA.

With the described, electronic regulated air suspension systems 36 for a vehicle 1 with pneumatic suspension, having at least one front steering axle A, at least one rear drive axle TA and a trailing axle SA in front of or behind the drive axle TA, it is possible to regulate the air suspension system 36 such that, proceeding from the regulation mode "pressure ratio regulation", a switch to the regulation mode "relieve trailing axle of load" is made if a check yields that a relief of the trailing axle SA of load as possible without thereby overloading the drive axle TA. Here, an automatic switch to the regulation mode "optimum traction" is performed if the relief of the trailing axle SA of load is possible and, in this way, it is possible to effect the relief of the trailing axle SA of load to a point of residual pressure maintenance and thus the load shift to the drive axle TA.

This approach can be automated if, proceeding from the regulation mode "pressure ratio regulation", it is continuously checked whether relieving the trailing axle SA of load is possible without thereby overloading the drive axle TA. An automatic switch from the regulation mode "pressure ratio regulation" via the regulation mode "relieve trailing axle of load" to the regulation mode "optimum traction" can thus be performed if the continuous checking of the axle loads yields that relieving the trailing axle SA of load is possible without the drive axle TA thereby being overloaded. If said boundary condition is met, an automatic switch to the regulation mode "optimum traction" is performed.

Furthermore, an automatic switch back to the regulation mode "pressure ratio regulation" is also possible if, during the continuous monitoring of the air pressures in the supporting bellows of the drive axle TA, the admissible axle load of the drive axle TA is detected as being overshot. In this way, a regulated increase of load on the trailing axle SA and a regulated relief of the drive axle TA of load to below the maximum axle load thereof are performed, whereby, ultimately, the admissible maximum axle load of the drive axle TA is maintained.

All of the features mentioned in the above description, in the claims and in the introductory part of the description may be used both individually and in any desired combination with one another. The invention is thus not restricted to the described and claimed, combinations of features. Rather, all combinations of features are to be regarded as being disclosed.

While the above description constitutes the preferred embodiments of the present invention, it will be appreciated that the invention is susceptible to modification, variation and change without departing from the proper scope and fair meaning of the accompanying claims.

The invention claimed is:

1. A method for traction regulation in a vehicle (1) with pneumatic suspension, which vehicle has at least one front steering axle (A), at least one rear drive axle (TA) and a trailing axle (SA) in front of or behind the drive axle (TA), by way of an electronic or regulated air suspension system (36), having at least the steps:

proceeding from a regulation mode "pressure ratio regulation", in which a parameterized ratio of air pressures in supporting bellows (2, 4) of the at least one drive axle (TA) in relation to air pressures in supporting bellows (3, 5) of the trailing axle (SA) is maintained, continuously automatically checking whether relieving the trailing axle (SA) of load is possible without thereby overloading the drive axle (TA), upon automatically determining that relieving the trailing axle (SA) of load in this way is possible, automatically switching to a regulation mode "optimum traction", in which the pressure in the supporting bellows (2, 4) of the at least one drive axle (TA) is increased and the pressure in the supporting bellows (3, 5) of the trailing axle (SA) is decreased in order to thereby effect a load shift to the at least one drive axle (TA) by relieving the trailing axle (SA) of load, without exceeding a maximum admissible axle load of the at least one drive axle (TA), relieving the trailing axle (SA) of load to a point of residual pressure maintenance, and thereby shifting load to the drive axle (TA) up to the maximum admissible axle load thereof, continuously checking the axle load of the drive axle (TA), and switching back to the regulation mode "pressure ratio regulation", with simultaneous increase of load on the trailing axle (SA) and relief of the drive axle (TA) of load upon detecting an exceedance of the maximum admissible axle load at the drive axle (TA) is detected.

2. An air suspension system (36) for a vehicle (1), having at least one front steering axle (A), at least one rear drive axle (TA) and a trailing axle (SA) in front of or behind the drive axle (TA), comprising an electronic control and regulation unit (7), an operating unit (8) configured to be actuated by a vehicle driver and which is connected to the electronic control and regulation unit (7), a valve block (9) which is connected to the electronic control and regulation unit (7) and which has multiple switching valves (16, 19, 22, 25), and in each case one pressure sensor (S2, S4; S3, S5), connected to the electronic control and regulation unit (7), at each of the supporting bellows (2, 4; 3, 5) of the at least one drive axle (TA) and of the trailing axle (SA), each of the multiple switching valves (16, 19, 22, 25) being connected to only one respective one of the supporting bellows (2, 4; 3, 5), wherein the electronic control and regulation unit (7) is configured to perform the following steps:

in the regulation mode "pressure ratio regulation", continuously automatically checking, on the basis of the present supporting bellows pressures, whether relieving the trailing axle (SA) of load is possible without thereby overloading the at least one drive axle (TA), upon determining that relieving the trailing axle (SA) of load is possible without thereby overloading the at least one drive axle (TA), automatically switching into a regulation mode "optimum traction", and in the regulation mode "optimum traction", increasing the pressure in the supporting bellows (2, 4) of the at least one drive axle (TA) by actuating the switching valves of the valve block (9), and decreasing the pressure in the supporting bellows (3, 5) of the trailing axle (SA) to a parameterized residual pressure, in order to thereby effect a load shift to the at least one drive axle (TA) by relieving the trailing axle (SA) of load without exceeding a maximum admissible axle load of the at least one drive axle (TA) and without undershooting a minimum admissible axle load of the trailing axle (SA).

3. The air suspension system as claimed in claim 2, further comprising a valve block (9), comprising an electromagnetic 3/2-way valve (10) whose inlet (11) is connected to a compressed-air source (14), whose first outlet (12) is connected to a deaeration device (15), and who second outlet (13) is connected to the inlets (17, 20, 23, 26) of four electromagnetic 2/2-way valves (16, 19, 22, 25), of which the outlets (18, 21) of a first and of a second electromagnetic 2/2-way valve (16, 19) are connected to a first supporting bellows (2) and to a second supporting bellows (4) respectively of the at least one drive axle (TA), and the outlets (24, 27) of a third and of a fourth electromagnetic 2/2-way valve (22, 25) are connected to a third supporting bellows (3) and to a fourth supporting bellows (5) respectively of the trailing axle (SA).

4. The air suspension system as claimed in claim 3, wherein the electronic control and regulation unit (7) is designed to, in the regulation mode "optimum traction", effect the release of the trailing axle (SA) of load and the increase of load on the at least one drive axle (TA) by virtue, firstly, of the electromagnetic 3/2-way valve (10) being switched into a pass-through position for compressed air from the first to fourth electromagnetic 2/2-way valves (16, 19, 22, 25) to the deaeration device (15) and, at the same time, the third and fourth electromagnetic 2/2-way valves (22, 25) of the trailing axle (SA) being switched into a pass-through position, whereas the first and second electromagnetic 2/2-way valves (16, 19) of the at least one drive axle (TA) are held in their blocking position in order to deaerate the supporting bellows (3, 5) of the trailing axle (SA) to a residual pressure, and then the third and fourth electromagnetic 2/2-way valves (22, 25) of the trailing axle (SA) are switched into their blocking position again, and subsequently, the electromagnetic 3/2-way valve (10) is switched again into a pass-through position for compressed air from the compressed-air source (14) to the first to fourth electromagnetic 2/2-way valves (16, 19; 22, 25), and the first and second electromagnetic 2/2-way valves (16, 19) of the at least one drive axle (TA) are switched into a pass-through position in order to regulate the air pressure in the first two supporting bellows (2, 4) of the at least one drive axle (TA) to such an extent that the maximum admissible axle load of the at least one drive axle (TA) is not exceeded and the minimum admissible axle load of the trailing axle (SA) is not undershot.

5. The air suspension system as claimed in claim 2 wherein the electronic control and regulation unit (7) is designed to do the following:

perform continuous monitoring of the at least one drive axle (TA) with regard to an exceedance of the maximum admissible axle load on the basis of the present supporting bellows pressures, performing an automatic switch from the regulation mode "optimum traction" back to the regulation mode "pressure ratio regulation" when the maximum admissible axle load of the at least one drive axle (TA) is exceeded, and controlling an increase of load on the trailing axle (SA) and a load shift to the trailing axle (SA) and adherence to the maximum admissible axle load of the at least one drive axle (TA).

6. The air suspension system as claimed in claim 2 wherein the operating unit (8) is designed to transmit a control command "relieve trailing axle of load", input by a vehicle driver during empty running, to the electronic control and regulation unit (7), and in that the electronic control and regulation unit (7) is designed to actuate the electromagnetic 2/2-way valves (16, 19, 22, 25) of the valve block (9) in accordance with one of the method claims.

7. The air suspension system as claimed in claim 2 wherein the electronic control and regulation unit (7) is designed to detect, on the basis of present supporting bellows pressures, whether empty running is present, and to actuate the 2/2-way valves (16, 19, 22, 25) of the valve block (9).

* * * * *